United States Patent [19]
Mueller et al.

[11] Patent Number: 5,667,036
[45] Date of Patent: Sep. 16, 1997

[54] LUBRICATION SYSTEM FOR TRANSMISSIONS

[75] Inventors: Wayne E. Mueller, Milford; Jermanjit S. Dhillon, Rochester Hills; Raymond A. Howell, Birmingham; Brian C. Moriarty, Waterford; Edward Perosky, Sterling Heights, all of Mich.

[73] Assignee: New Venture Gear, Inc., Troy, Mich.

[21] Appl. No.: 651,094

[22] Filed: May 21, 1996

[51] Int. Cl.[6] ............................................. F01M 9/00
[52] U.S. Cl. ...................... 184/6.12; 184/11.2; 184/11.1; 74/467
[58] Field of Search ............................ 184/6.12, 11.1, 184/11.2; 74/467, 468

[56] References Cited

U.S. PATENT DOCUMENTS

| | | | |
|---|---|---|---|
| 3,785,458 | 1/1974 | Caldwell et al. | 184/6.12 |
| 3,834,248 | 9/1974 | Caliri | 74/467 |
| 4,480,493 | 11/1984 | Takahashi | 74/467 |
| 4,987,974 | 1/1991 | Crouch | 184/6.12 |
| 5,005,437 | 4/1991 | Furer et al. | 74/467 |
| 5,341,901 | 8/1994 | Mueller et al. | 184/6.12 |
| 5,480,003 | 1/1996 | Hill et al. | 184/6.12 |
| 5,522,476 | 6/1996 | Holman . | |
| 5,558,180 | 9/1996 | Yanagisawa | 184/11.2 |

*Primary Examiner*—Thomas E. Denion
*Attorney, Agent, or Firm*—Harness, Dickey & Pierce, P.L.C.

[57] ABSTRACT

An oil distributing apparatus for use with a transmission, and method for producing the same, are disclosed to provide an improved lubrication system for supplying lubricating fluid to certain areas of the transmission. The improved lubrication system includes an oil distributing apparatus having an end plate connectable to a transmission housing and an oil dam connected to the end plate to form an oil chamber therebetween that is hydraulically connectable to a supply of lubricating fluid in the transmission. The oil chamber provides a flow path that is substantially isolated from the turbulence inducing effects of the rotating shafts and associated bearings in the transmission.

13 Claims, 2 Drawing Sheets

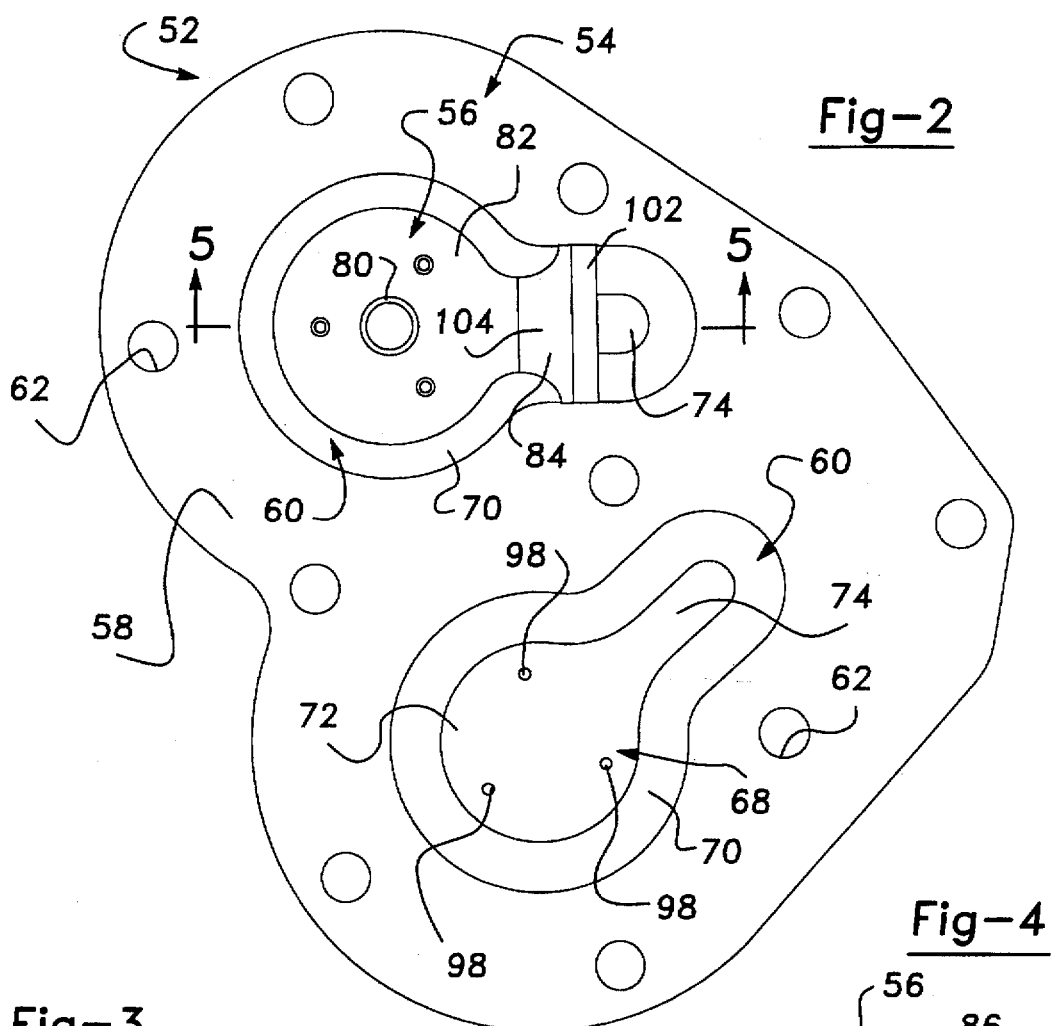
Fig-2
Fig-4
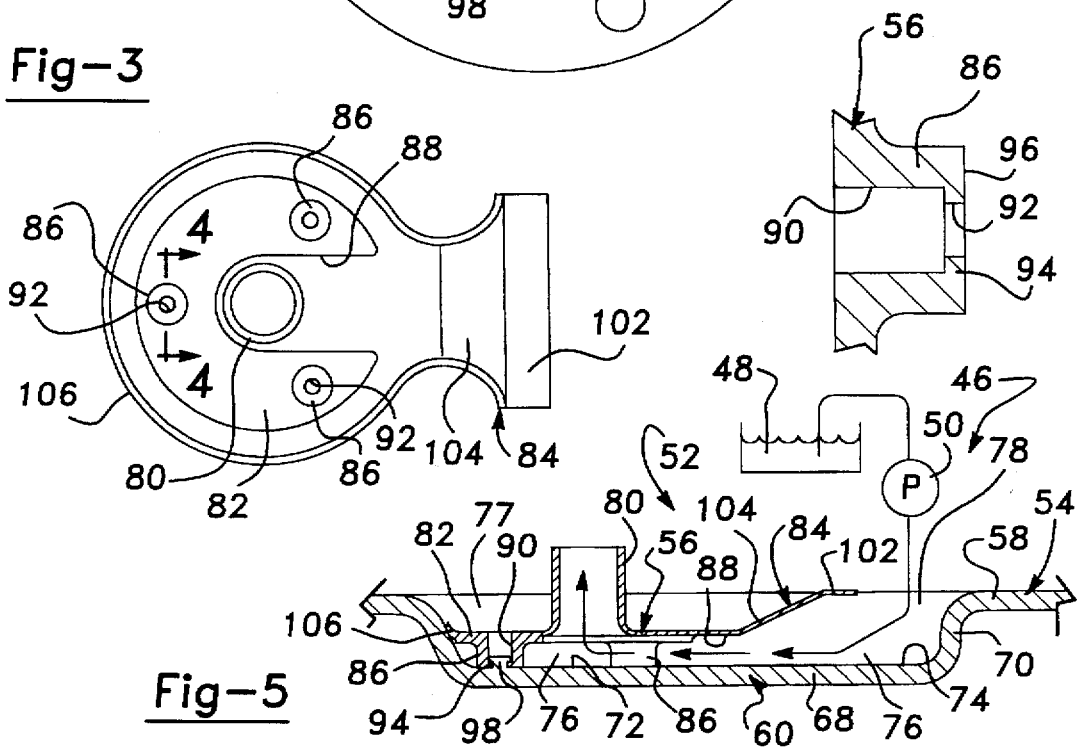
Fig-3
Fig-5

LUBRICATION SYSTEM FOR TRANSMISSIONS

BACKGROUND OF THE INVENTION

The present invention relates to a lubrication system for use in manual transmissions.

As is known, manual transmissions are used in a plethora of motor vehicle applications for transmitting rotary power (i.e., drive torque) from an input shaft to one or more output shafts at various speed ratios. To provide the desired speed ratios, a number of constant mesh gearsets are supported on the shafts, with a drive gear fixed to one shaft and a driven gear rotatably supported on the other shaft. A suitable clutch arrangement is provided for permitting the driven gear of the gearset to be coupled to its shaft for transmitting rotary power thereto. Transmissions generally include a housing within which the rotary components of the transmission are disposed and a lubrication system for supplying lubricating fluid to the rotary components.

In many instances, the transmission is constructed such that the lubrication system delivers oil from an internal reservoir or sump area within the housing to an axial cavity formed in each shaft which, in turn, communicates with a series of radially-extending passages for directing the flow of oil to the shaft surface and/or bearings supporting the driven gear so as to provide lubrication thereto. Such oil lubrication systems typically includes a passageway formed in the housing for directing oil from the reservoir to an oil cap mounted in the axial cavity in each rotating shaft. Traditionally, the oil flowing to the oil cap is exposed to several of the rotary components of the transmission. This is problematic in that the centrifugal forces generated by such rotary components tend to drive the oil back toward the passageway, thereby decreasing the flow efficiency of the oil supply.

In view of the above, a continuing need exists to address the problems associated with the oil flow characteristics provided by conventional oil caps.

SUMMARY OF THE INVENTION

The unique oil distributing apparatus disclosed herein directly addresses the above-noted concerns while providing advantages over conventional oil lubrication systems. The unique oil distributing apparatus disclosed herein efficiently conveys a lubricating fluid from a reservoir to an axial bore formed in a shaft supported for rotation in a housing. Specifically, the present invention provides an oil distributing apparatus having an oil dam connected to an end plate to form an oil chamber hydraulically connecting an inlet trough with the axial bore in the shaft while isolating the oil from the flow disrupting effects caused by rotation of the shaft and its associated bearings.

One object of this invention is to provide an oil distributing apparatus for use in a multi-speed manual transmission.

An additional object of this invention is to provide an oil dam having a plurality of spacer legs contacting the end plate to define the size of the oil chamber formed between the end plate and the oil dam.

A further object of this invention is to provide an aperture in each oil dam spacer leg and a post on the end plate which, when swaged, contacts the spacer leg surrounding the aperture and draws the oil dam toward the end plate, thereby forming a seal between the oil dam and the end plate.

Accordingly, the invention provides an oil distributing apparatus and method for assembling the same. The oil distributing apparatus includes an end plate and at least one oil dam having a peripheral edge cooperating with an embossed segment formed in the end plate to define an oil chamber. The oil dam further includes a spout providing a fluid communication path between the oil chamber and an axial bore formed in the transmission shaft. Spacer legs formed on the oil dam contact the end plate when the oil dam is connected thereto so as to define the size of the oil chamber. Each spacer leg includes an aperture cooperative with a post formed on the end plate to secure the oil dam to the end plate. The oil distributing apparatus is assembled by placing the oil dam in cooperation with the end plate and swaging the post formed thereon so as to draw the oil dam closer to the end plate until the spacer legs contact the end plate. The swaging operation causes the oil dam to move relative to the end plate which, in turn, causes the oil dam periphery to contact the end plate, be deflected thereby, and form a seal therewith.

BRIEF DESCRIPTION OF THE DRAWINGS

FIG. 2 is a plan view of the oil distributing apparatus showing one of the oil dams secured to the transmission end plate and the other oil dam removed therefrom for purposes of clarity;

FIG. 3 is another plan view of the oil dams;

FIG. 4 is an enlarged partial sectional view taken along line 4—4 of FIG. 3; and FIG. 5 is a sectional view taken along the line 5—5 of FIG. 2.

DETAILED DESCRIPTION OF THE PREFERRED EMBODIMENT

Figure 1:
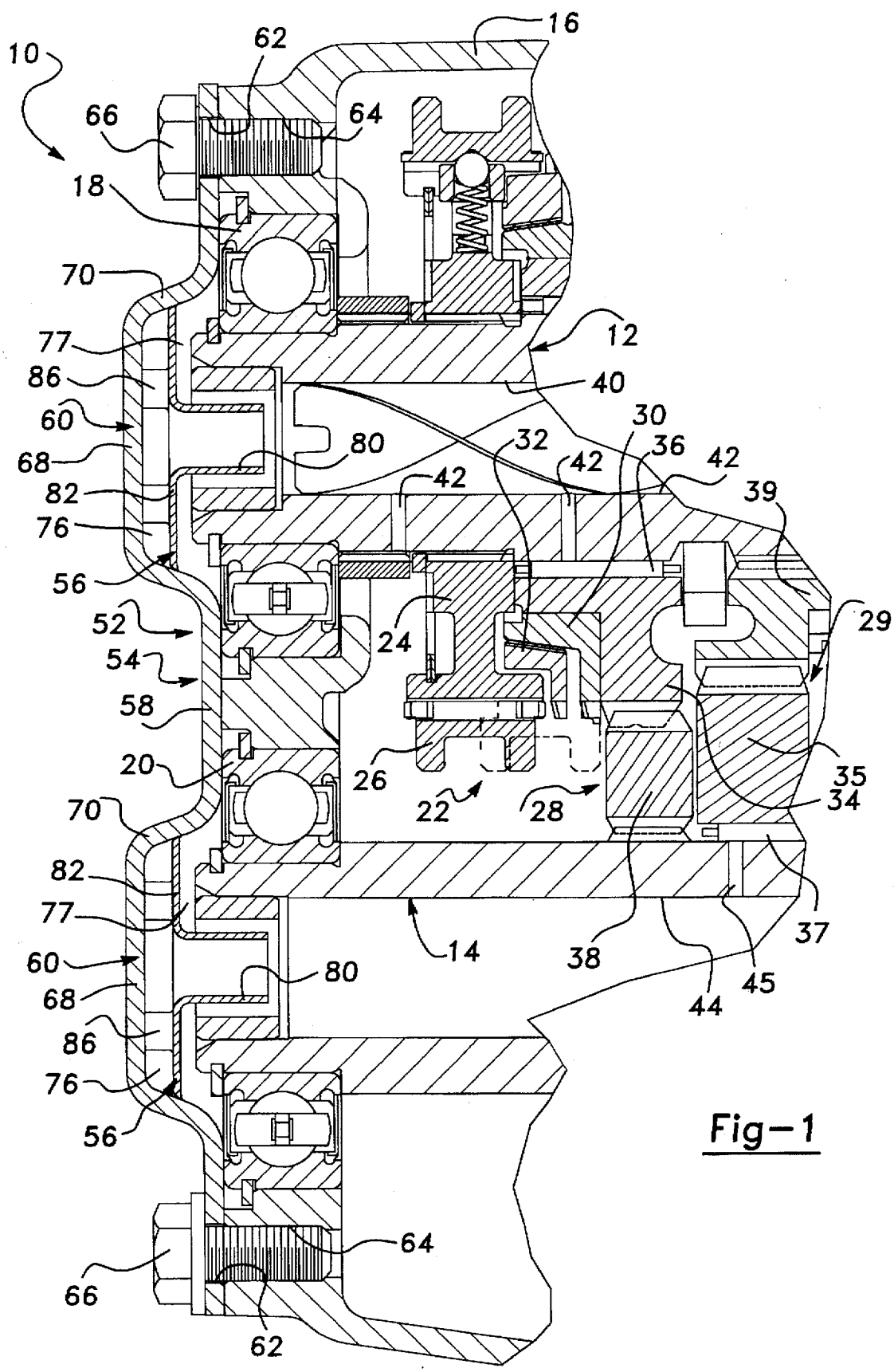
FIG. 1 is a partial sectional view of a manual transmission having the improved oil distributing apparatus installed therein.

In general, the present invention discloses an oil distributing apparatus installed in a power transmission between the transmission housing and the adjacent end of a rotatable shaft for delivering lubricating fluid to portions of the shaft. The oil distributing apparatus includes an end plate secured to the transmission housing and one or more oil dams each mounted in an embossed portion of the end plate and cooperating therewith to define a sealed oil chamber. An inlet to the oil chamber is supplied with lubricating fluid from a fluid reservoir located within the transmission such that fluid flows through the oil chamber and is discharged from a spout formed in the oil dam. The oil distributing apparatus is arranged such that the spout extends into a longitudinal flow passage in the shaft, thereby providing an oil flow path that is isolated from the turbulence inducing effects of the shaft.

FIG. 1 illustrates a partial sectional view of a manual multi-speed transmission 10 having an input shaft 12 and an output shaft 14 disposed for rotation within a transmission housing 16. As will be appreciated by those skilled in the art, the opposite ends of input shaft 12 and output shaft 14 are rotatably supported in housing 16 by suitable bearing assemblies, such as bearing assemblies 18 and 20. As is otherwise conventional, transmission 10 includes a clutch assembly 22 having a hub 24 fixed (i.e., splined) to input shaft 12, a clutch sleeve 26 supported for rotation with and axial sliding movement on hub 24, a constant-mesh gearset 28, a clutch plate 30, and a synchronizer assembly 32 disposed between clutch sleeve 26 and clutch plate 30. Gearset 28 includes a first driven gear 34 supported by a bearing assembly 36 on input shaft 12 for rotation relative thereto, and a first drive gear 38 fixedly secured (i.e., splined) to output shaft 14 for rotation therewith. As seen, clutch plate 30 is fixedly secured to driven gear 34. Clutch sleeve 26 is slidable between the "neutral" position shown and an "engaged" position (shown in phantom lines) whereat gearset 28 is coupled to input shaft 12. A second gearset 29 is also shown and includes a second driven gear 35 rotatably supported by a bearing assembly 37 on output shaft 14, and a second drive gear 39 fixedly secured (i.e., splined) to input shaft 12. While not shown, a clutch assembly similar to clutch assembly 22 would be provided adjacent to second gearset 29 for selectively coupling input shaft 12 to output shaft 14. Transmission 10 is merely exemplary and may have any number of additional constant-mesh gearsets and corresponding clutch assemblies which, under the control of a manually-operated gear shift mechanism, operate for selectively establishing various preselected gear ratios between input shaft 12 and output shaft 14. As will be appreciated by those skilled in the art, the bearings disposed between the rotating transmission elements (i.e., bearings assemblies 18, 20, 36 and 37) operate most efficiently when provided with an adequate supply of a lubricating fluid.

With continued reference to FIG. 1, input shaft 12 is shown to include an axial bore 40 in fluid communication with a plurality of radial oil passages 42 for providing a fluid flow path between axial bore 40 and the outer surface of input shaft 12 for lubricating bearing assembly 36. Likewise, output shaft 14 has an axial bore 44 which communicates with a plurality of radial oil passages 45 for providing a similar fluid flow path between axial bore 44 and the outer surface of output shaft 14 for lubricating bearing assembly 37. Accordingly, the present invention is directed to a lubrication system 46 within transmission 10 for supplying lubricating fluid from a reservoir 48 to axial bores 40 and 44 in a manner that isolates the flow paths from the centrifugal effects and turbulence caused by rotation of shafts 12 and 14. To this end, lubrication system 46 includes a pumping apparatus 50 for drawing lubricating fluid from reservoir 48, and an oil distributing apparatus 52 that is supplied with lubricating fluid by pumping apparatus 50. While only schematically shown in FIG. 5, it is understood that reservoir 48 is maintained within housing 16 and that pumping apparatus 50 can be any suitable device or arrangement such as, for example, a gerotor-type eccentric pump, likewise mounted within housing 16.

According to the particular embodiment shown, oil distributing apparatus 52 includes an end plate 54 and a pair of oil dams 56. End plate 54 includes a mounting segment 58 and a pair of embossed segments 60. A plurality of mounting apertures 62 are formed in mounting segment 58 and which are alignable with threaded bores 64 formed in housing 16 for receipt of threaded bolts 66 therein to secure end plate 54 directly to housing 16. As seen, one of embossed segments 60 of end plate 54 is aligned with input shaft 12 and has an oil dam 56 disposed therein. Likewise, the other embossed segment 60 of end plate 54 is shown to be aligned with output shaft 14 with the other oil dam 56 disposed therein. FIG. 2 shows oil distributing apparatus 52 removed from housing 16 with the one of oil dams 56 associated with output shaft 14 removed from end plate 54 to better illustrate its corresponding embossed segment 60. Each embossed segment 60 of end plate 54 is generally pear-shaped and includes a planar portion 68 integrally interconnected to mounting segment 58 by an angulated portion 70. More specifically, planar portion 68 of each embossed segment 60 includes a circular cavity portion 72 and an elongated inlet portion 74 with angulated portion 70 defining a sloped continuous rim encircling the entire periphery of planar portion 68. Each oil dam 56 is installed in an embossed segment 60 such that it encloses all of circular cavity portion 72 and some of elongated inlet portion 74 for defining an oil chamber 76 and an inlet trough 78. Lubricating fluid is delivered to each inlet troughs 78 by pumping apparatus 50 and flows through oil chambers 76 from which it is subsequently discharged through spouts 80 in oil dams 56 that are aligned to extend into axial bores 40 and 44. Inlet troughs 78 can be in fluid communication with pumping apparatus 50 either directly or via channels formed in housing 16. Lubricating fluid is also supplied to a portion 77 of each embossed segment 60 isolated from oil chambers 76 for lubricating bearing assemblies 18 and 20.

Each oil dam 56 includes a circular body 82 having a flanged tab 84 extending therefrom. Spout 80 is shown as a cylindrical tube formed in circular body 82. Each oil dam 56 also includes a plurality of spacer legs 86 that project substantially perpendicularly from circular body 82. Preferably, spacer legs 86 are located at a constant radial distance from spout 80 and are spaced at an equal angular distance from one another. A recessed channel 88 is formed in oil dam body 82 between a pair of adjacent spacer legs 86. Channel 88 extends radially from spout 80 toward flanged tab 84 and is alignable with elongated inlet portion 74 of embossed segment 60 so as to direct oil through inlet trough 78 and oil chamber 76 to spout 80. As best seen in FIG. 4, spacer legs 86 are formed integral with oil dam body 82 to include a cylindrical bore 90 and a mounting aperture 92. In the preferred embodiment, mounting aperture 92 has a diameter that is less than the diameter of bore 90, thereby forming an annular lip 94 proximate to a terminal end 96 of each spacer leg 86. A plurality of posts 98 extend from circular cavity portion 72 of each embossed segment 60 to provide means for mounting oil dams 56 to end plate 54. Specifically, oil dams 56 are coupled to end plate 54 by locating each oil dam 56 within an embossed segment 60 such that each post 98 is disposed within and extends through each mounting aperture 92. The distal end of posts 98 is then deformed (i.e., swaged) to contact annular lip 94. As a result, the size of oil chambers 76 are primarily dictated by the length of spacer legs 86.

With reference to FIGS. 3 and 5, flanged tab 84 is shown to include a distal segment 102 and an intermediate segment 104. With oil dam 56 mounted in embossed segment 60 of end plate 54, distal segment 102 of flanged tab 84 is aligned to be generally co-planar with mounting segment 58 and generally parallel to circular body 82. Further, in the preferred embodiment of the present invention, oil dams 56 are formed to include a peripheral edge seal defined by a rim segment 106 having reduced cross-sectional thickness and which circumscribes both oil dam body 82 and intermediate segment 104 of flanged tab 84. Rim segment 106 of oil dam 56 cooperates with angulated portion 70 of embossed segment 60 to isolate oil chamber 76 from the turbulence inducing effects of the rotary components located proximate thereto. When oil dams 56 are caused to move toward planar portion 68 of embossed segments 60 by the swaging of posts 98, rim segments 106 contact, and are deflected away from, end plate angular portion 70, thereby forming a fluid-tight seal between oil dams 56 and end plate 54.

As indicated by the flow direction arrows in FIG. 5, oil enters axial bore 40 of input shaft 12 by passing from the oil inlet trough 78 and into sealed oil chamber 76, along channel 88, and through spout 80. It should by now be appreciated that oil is delivered to axial bore 44 of output shaft 14 in a substantially identical manner. In some applications, end plate 54 may only have one embossed segment 60. Likewise, the peripheral configuration of embossed segments 60 can be modified to meet different fluid flow requirements.

Various other advantages and modifications will become apparent to one skilled in the art after having the benefit of studying the teachings of the specification, the drawings and the following claims.

What is claimed is:

1. An oil distributing apparatus for use with a transmission having a shaft rotatably supported in a housing and a lubrication system for communicating lubricating fluid from a reservoir within the housing to an axial bore in the shaft, said oil distributing apparatus comprising:

an end plate secured to the transmission housing and having an embossed segment; and an oil dam secured in said embossed segment of said end plate so as to define an inlet trough and a sealed oil chamber therewith, said oil dam having a spacer leg extending into said oil chamber and engaging said end plate, and a spout extending into the axial bore in the shaft for establishing a flow pathway between said oil chamber and the axial bore, and wherein the lubrication system provides lubricating fluid from the reservoir to said inlet trough.

2. The oil distributing apparatus of claim 1 wherein said oil dam includes a circular body and a flanged tab extending therefrom, and wherein said embossed segment of said end plate has a circular cavity portion and an inlet portion extending therefrom, said circular body of said oil dam cooperates with said circular cavity portion of said embossed segment to define said oil chamber, and said tab cooperates with said inlet portion to define said inlet trough.

3. The oil distributing apparatus of claim 1 wherein said oil dam includes a peripheral rim portion sealingly engaging said embossed segment of said end plate.

4. The oil distributing apparatus of claim 1 wherein said spacer leg includes a bore and an aperture defining an opening extending through said spacer leg, said bore having a diameter, said aperture having a diameter less than the diameter of said bore thereby forming an annular lip, and wherein said end plate includes a post extending through said aperture and into said bore with a distal end of said post deformed to contact said annular lip and thereby secure said oil dam to said end plate.

5. A transmission comprising:

a housing;

an oil reservoir within said housing having a supply of lubricating fluid;

a shaft rotatably supported in said housing, said shaft having an axial bore;

an oil distributing apparatus including an end plate secured to said housing and having an embossed segment formed therein, and an oil dam secured in said embossed segment of said end plate for defining an inlet and an oil chamber therewith, said oil dam having a spacer leg extending into said oil chamber and engaging said end plate and a tubular spout extending into said axial bore of said shaft for defining a oil flow path from said inlet to said axial bore of said shaft that is substantially hydraulically isolated from said shaft; and a lubrication system for conveying oil from said oil reservoir to said inlet of said oil chamber.

6. The transmission of claim 5 wherein said oil dam includes a circular body having a peripheral edge and a tab integral with said circular body, said spacer leg projects from said body in a first direction, and said tubular spout extends from said body in a second direction opposite said first direction, said oil dam coupled to said end plate such that said peripheral edge of said oil dam sealingly engages said end plate adjacent said embossed segment.

7. A transmission comprising:

a housing;

an oil reservoir within said housing having a supply of lubricating fluid;

an input shaft rotatably supported in said housing, said input shaft having an axial bore;

an output shaft rotatably supported in said housing, said output shaft having an axial bore;

an oil distributing apparatus secured to said housing, said oil distributing apparatus defining first and second oil chamber each having an inlet and an outlet, said outlet of said first oil chamber communicating with said axial bore of said input shaft, said outlet of said second oil chamber communicating with said axial bore of said output shaft, said first oil chamber defining a first oil flow path from said inlet to said outlet thereof that is substantially hydraulically isolated from said input shaft and said output shaft, said second oil chamber defining a second oil flow path from said inlet to said outlet thereof that is substantially hydraulically isolated from said input shaft and said output shaft, said oil distributing apparatus includes an end plate secured to said housing, a first oil dam and a second oil dam, said end plate including a first embossed segment and a second embossed segment, said first oil dam connected to said end plate and cooperating with said first embossed segment to define said first oil chamber, said second oil dam connected to said end plate and cooperating with said second oil embossed segment to define said second oil chamber, and wherein each of said first and second oil dams includes a tubular spout extending into its respective axial bore in said input and output shafts and a spacer leg extending into its respective one of said first and second oil chambers and engaging said end plate; and a lubrication system for conveying oil from said oil reservoir to said inlet of said first and second oil chambers.

8. The transmission of claim 7 wherein said first and second oil dams each include a circular body having a peripheral edge and a tab integral with said circular body, said spacer leg projecting from said body in a first direction, and said tubular spout extending from said body in a second direction opposite said first direction, said first oil dam is coupled to said end plate such that said peripheral edge of said first oil dam sealingly engages said end plate adjacent said first embossed segment, and said second oil dam is coupled to said end plate such that said peripheral edge of said second oil dam sealingly engages said end plate adjacent said second embossed segment.

9. A method of assembling an oil directing apparatus for use in a transmission comprising the steps of:

providing an end plate having a recessed portion and a post;

providing an oil dam having a peripheral edge, a spacer leg, and a cylindrical spout, said spacer leg having a bore and a terminal end with an aperture formed therein, said bore and said aperture defining an opening extending through said spacer leg, said bore having a diameter, said aperture having a diameter smaller than the diameter of said axial bore thereby forming an annular lip;

placing said oil dam adjacent said end plate such that said end plate post is disposed within said spacer leg aperture and said peripheral edge of said oil dam is proximate to said recessed portion of said end plate, said oil dam and said recessed portion of said end plate defining an oil chamber having an inlet; and deforming said end plate post into contact with said annular lip, whereby said terminal end of said spacer leg contacts said end plate and said peripheral edge of said oil dam contacts said recessed portion of said end plate for forcing said peripheral edge into a deflected position, thereby forming a seal between said end plate and said oil dam.

10. An oil distributing apparatus for use with a transmission having a shaft rotatably supported in a housing and a lubrication system for communicating lubricating fluid from a reservoir within the housing to an axial bore in the shaft, said oil distributing apparatus comprising:

an end plate secured to the transmission housing and having an embossed segment, said embossed segment includes an elongated inlet portion and a circular portion coaxially aligned with the axial bore in the shaft; and an oil dam secured in said embossed segment of said end plate and having sealing means for enclosing all of said circular portion and part of said inlet portion of said embossed segment so as to define an inlet trough and a sealed oil chamber therewith, said oil dam having a spout extending into the axial bore in the shaft for establishing a flow pathway between said oil chamber and the axial bore, and wherein the lubrication system provides lubricating fluid from the reservoir to said inlet trough.

11. The oil distributing apparatus of claim 10 wherein said oil dam includes a circular body and a flanged tab extending therefrom, said circular body of said oil dam cooperates with said circular portion of said embossed segment to define said oil chamber and said tab cooperates with said inlet portion to define said inlet trough.

12. The oil distributing apparatus of claim 10 wherein said sealing means includes a peripheral rim portion formed on said oil dam for sealingly engaging said embossed segment of said end plate.

13. The oil distributing apparatus of claim 10 wherein said oil dam further includes a spacer leg that is disposed within said oil chamber and which contacts said end plate when said oil dam is connected thereto.

* * * * *